(12) United States Patent
Choi et al.

(10) Patent No.: US 8,004,771 B2
(45) Date of Patent: Aug. 23, 2011

(54) VARIFOCAL LENS AND METHOD OF MANUFACTURING THE SAME

(75) Inventors: Seung-tae Choi, Osan-si (KR);
Seung-wan Lee, Suwon-si (KR);
Jeong-yub Lee, Seoul (KR); Jong-oh Kwon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 78 days.

(21) Appl. No.: 12/626,220

(22) Filed: Nov. 25, 2009

(65) Prior Publication Data

US 2010/0128359 A1 May 27, 2010

(30) Foreign Application Priority Data

Nov. 26, 2008 (KR) .................. 10-2008-0118354
Nov. 5, 2009 (KR) .................. 10-2009-0106672

(51) Int. Cl.
*G02B 1/06* (2006.01)
*G02B 3/12* (2006.01)

(52) U.S. Cl. ........................ 359/666; 359/665
(58) Field of Classification Search .......... 359/665–667
See application file for complete search history.

(56) References Cited

U.S. PATENT DOCUMENTS

| | | | |
|---|---|---|---|
| 5,574,598 A | 11/1996 | Koumura et al. | |
| 6,188,526 B1 * | 2/2001 | Sasaya et al. | 359/666 |
| 7,369,321 B1 | 5/2008 | Ren et al. | |
| 7,672,059 B2 * | 3/2010 | Batchko et al. | 359/666 |
| 7,755,840 B2 * | 7/2010 | Batchko et al. | 359/665 |
| 2007/0030573 A1 | 2/2007 | Batchko et al. | |
| 2008/0112059 A1 * | 5/2008 | Choi et al. | 359/664 |
| 2008/0144186 A1 * | 6/2008 | Feng et al. | 359/666 |
| 2008/0313832 A1 | 12/2008 | Wimmer et al. | |
| 2009/0180198 A1 * | 7/2009 | Lee et al. | 359/666 |
| 2009/0310224 A1 * | 12/2009 | Yu et al. | 359/666 |
| 2010/0110560 A1 * | 5/2010 | Cho | 359/666 |
| 2010/0118413 A1 * | 5/2010 | Kim et al. | 359/666 |
| 2010/0165475 A1 * | 7/2010 | Lee et al. | 359/666 |
| 2011/0051254 A1 * | 3/2011 | Lee et al. | 359/666 |
| 2011/0051255 A1 * | 3/2011 | Lee et al. | 359/666 |

FOREIGN PATENT DOCUMENTS

| | | |
|---|---|---|
| EP | 1 924 471 B1 | 10/2009 |
| JP | 2000-81504 A | 3/2000 |
| JP | 2006-146235 A | 6/2006 |
| JP | 2006-154044 A | 6/2006 |
| JP | 2006-154227 A | 6/2006 |
| KR | 10-2001-0074453 A | 8/2001 |
| KR | 10-2006-0118266 A | 11/2006 |
| KR | 10-2007-0039165 A | 4/2007 |
| KR | 10-2008-0043106 A | 5/2008 |
| WO | 2006/016306 A1 | 2/2006 |
| WO | 2006/088514 A2 | 8/2006 |
| WO | 2008/138010 A1 | 11/2008 |

* cited by examiner

*Primary Examiner* — Evelyn A. Lester
(74) *Attorney, Agent, or Firm* — Sughrue Mion, PLLC

(57) ABSTRACT

Provided is a varifocal lens and method of manufacturing the varifocal lens. The varifocal lens includes a transparent substrate, a spacer frame arranged to form an inner space on the transparent substrate, wherein the inner space is to be filled with an optical fluid, a rigid frame disposed to be adjacent to the spacer frame, and an optical membrane and an actuator which are formed on a surface of the rigid frame. The rigid frame supports the actuator and the optical membrane, wherein the actuator applies a pressure to an optical fluid and the optical membrane is modified according to a flow of the optical fluid.

26 Claims, 10 Drawing Sheets

VARIFOCAL LENS AND METHOD OF MANUFACTURING THE SAME

CROSS-REFERENCE TO RELATED APPLICATION

This application claims the benefit of Korean Patent Application Nos. 10-2008-0118354, filed on Nov. 26, 2008, and 10-2009-0106672, filed on Nov. 5, 2009 in the Korean Intellectual Property Office, the disclosures of which are incorporated herein their entirety by reference.

BACKGROUND

1. Field

One or more exemplary embodiments consistent with the present invention relate to a varifocal lens and method of manufacturing the same, which has a structure that can be manufactured on a wafer, and which can be applied to electronic devices such as a camera module, and the like.

2. Description of the Related Art

Wireless portable communication devices are developed as multipurpose electronic devices including various functions such as a camera, a game, music reproduction, broadcasting, Internet, and the like, as well as functions of a phone and message delivery. Also, high integration is being conducted to integrate as large a variety of functional components as possible into an area as small as possible. In this regard, a camera module is one device whose size is difficult to reduce. Since components for implementing an auto-focus function, image-stabilization function, and a zoom function have to be further added to obtain a better image, there is a limit to how much a size of an optical imaging system can be reduced.

Examples of auto-focus implementing methods, performed by a conventional camera, are a method using a step motor, a method using a voice coil motor (VCM), a method using a liquid lens, and the like. From among these methods, due to a size problem, the method using the step motor or the method using the VCM is difficult to apply to mobile devices or is difficult to use in a batch manufacturing process. In order to use the method using a liquid lens, it is necessary to make a design capable of guaranteeing an optical function and simultaneously, capable of reducing a size of a liquid lens.

SUMMARY

One or more embodiments include a varifocal lens having a structure that is appropriate for improving an optical function and for miniaturization and a method of manufacturing the same.

Additional aspects will be set forth in part in the description which follows and, in part, will be apparent from the description, or may be learned by practice of the invention.

To achieve the above and/or other aspects, one or more embodiments may include a varifocal lens including a transparent substrate; a spacer frame arranged to form an inner space above the transparent substrate; a rigid frame including a lens hole and one or more through-holes, and having first and second surfaces facing away from each other, wherein the first surface is disposed to be adjacent to the spacer frame; an optical membrane having a lens surface corresponding to the lens hole of the rigid frame, and is arranged to face the first surface; an optical fluid for filling the inner space; and an actuator arranged to be fixed to the rigid frame and applying a pressure to the optical fluid so as to change a shape of the lens surface.

The spacer frame may have a shape to be a sidewall encircling an edge of the transparent substrate, and thus forms a single inner space.

The one or more through-holes may include a plurality of through-holes, and the plurality of through-holes are formed around the lens hole.

The actuator may include a polymer actuator arranged to seal the plurality of through-holes.

The polymer actuator may be formed on the second surface, and the optical fluid may be arranged to fill a space formed by the transparent substrate, the spacer frame, the rigid frame, the optical membrane and the polymer actuator.

The polymer actuator may be formed on the first surface, and the optical fluid may be arranged to fill a space formed by the transparent substrate, the spacer frame, the optical membrane and the polymer actuator.

The polymer actuator may be formed on the first surface, and the optical membrane may be formed on the spacer frame so as to seal the inner space filled with the optical fluid.

To achieve the above and/or other aspects, one or more embodiments may include a varifocal lens added to an optical imaging system having a predetermined focal distance, thereby adjusting a total focal distance, the varifocal lens including a transparent substrate; a spacer frame arranged to form an inner space above the transparent substrate; a rigid frame including a lens hole and one or more through-holes, and having first and second surfaces facing away from each other, wherein the first surface is disposed to be adjacent to the spacer frame; an optical membrane having a lens surface corresponding to the lens hole of the rigid frame, and is arranged to face the first surface; an optical fluid for filling the inner space; and an actuator arranged to be fixed to the rigid frame and applying a pressure to the optical fluid so as to change a shape of the lens surface, wherein, when an aperture, via which a light from the optical imaging system reaches the varifocal lens, is referred to as A, an angle of view is 2ω, and a distance between the optical imaging system and the lens surface is d, a diameter D of the lens hole satisfies $$D \geq A + 2d \cdot \tan \omega \quad \text{[Equation]}$$

To achieve the above and/or other aspects, one or more embodiments may include a method of manufacturing a varifocal lens, the method including the operations of forming a rigid frame including a lens hole and one or more through-holes, and having first and second surfaces facing away from each other; forming a polymer actuator on the second surface so as to be fixed to the rigid frame; forming an optical membrane on the second surface, wherein the optical membrane has a lens surface corresponding to the lens hole; forming a spacer frame so as to form a predetermined inner space with the polymer actuator, a rigid frame, and an optical membrane; filling the predetermined inner space with an optical fluid; and forming a transparent substrate on the spacer frame so as to seal the optical fluid.

To achieve the above and/or other aspects, one or more embodiments may include a method of manufacturing a varifocal lens, the method including the operations of forming a rigid frame including a lens hole and one or more through-holes, and having first and second surfaces facing away from each other; forming a polymer actuator on the first surface so as to be fixed to the rigid frame; forming an optical membrane on the second surface, wherein the optical membrane has a lens surface corresponding to the lens hole; forming a spacer frame so as to form a predetermined inner space with the polymer actuator and an optical membrane; filling the predetermined inner space with an optical fluid; and forming a transparent substrate on the spacer frame so as to seal the optical fluid.

To achieve the above and/or other aspects, one or more embodiments may include a method of manufacturing a varifocal lens, the method including the operations of forming a rigid frame having a lens hole and one or more through-holes, and forming a polymer actuator on the rigid frame so as to be fixed to the rigid frame; arranging an optical membrane including a first surface and a second surface facing each other, and forming an inner space by forming a spacer frame on the first surface, wherein the spacer frame has a shape to be a sidewall encircling an edge of the optical membrane; filling the inner space with an optical fluid; forming a transparent substrate on the spacer frame so as to seal the optical fluid; and bonding the rigid frame whereon the polymer actuator is formed to the second surface of the optical membrane.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
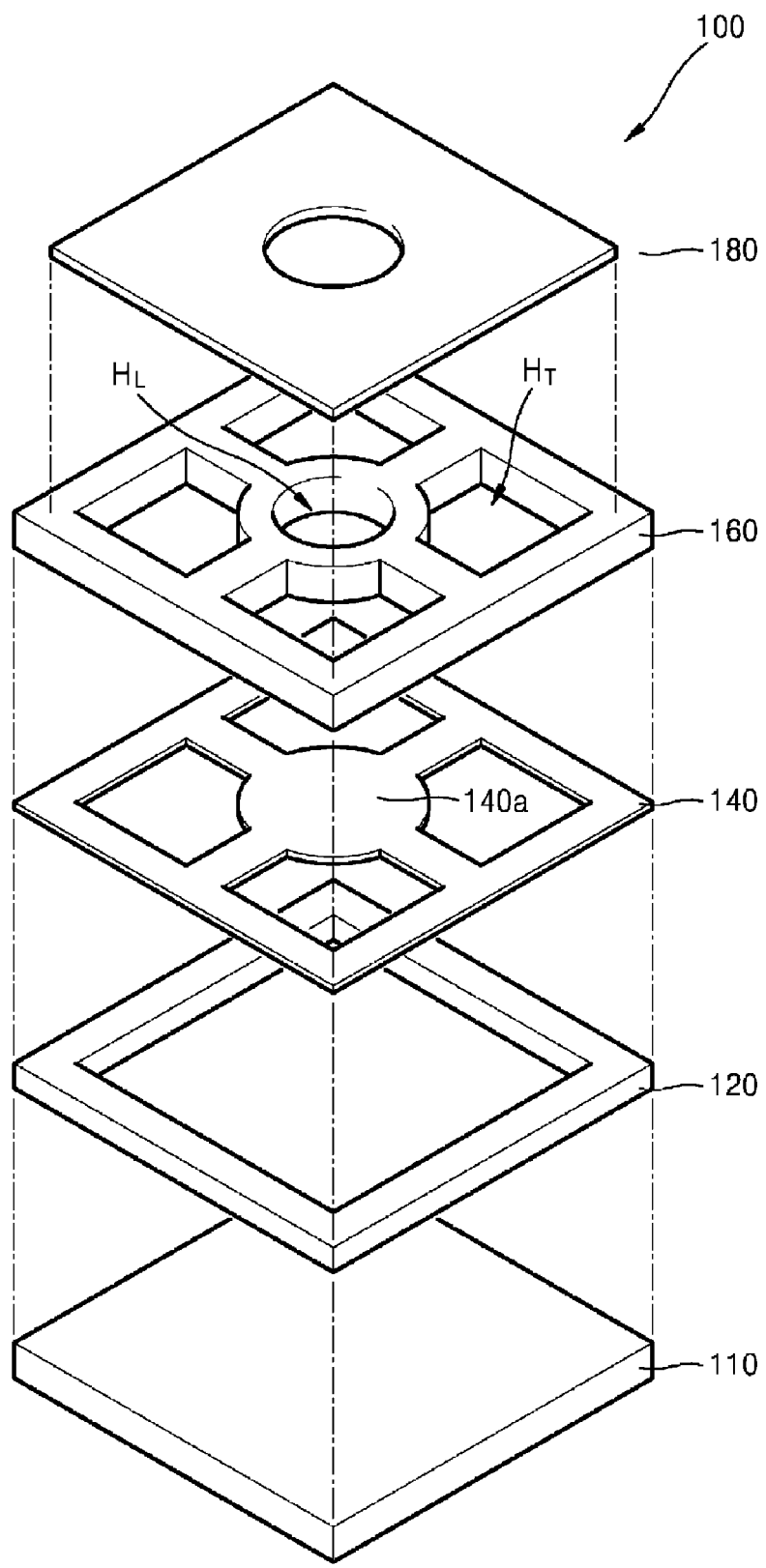
FIG. 1 is an exploded perspective view of a structure of a varifocal lens according to an embodiment.

Reference will now be made in detail to embodiments, examples of which are illustrated in the accompanying drawings, wherein like reference numerals refer to the like elements throughout, and the thicknesses of layers and regions are exaggerated for clarity. In this regard, the present exemplary embodiments may have different forms and should not be construed as being limited to the descriptions set forth herein. Accordingly, the exemplary embodiments are merely described below, by referring to the figures, to explain aspects of the present description.

Figure 2:
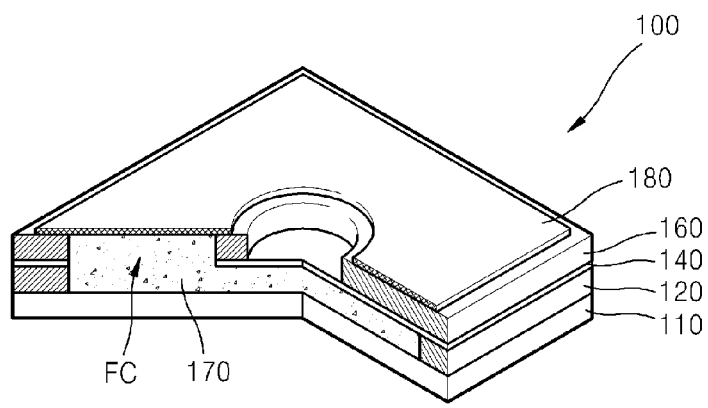
FIG. 2 is a partially cut perspective view of the structure of the varifocal lens according to the embodiment of FIG. 1.
Figure 3:
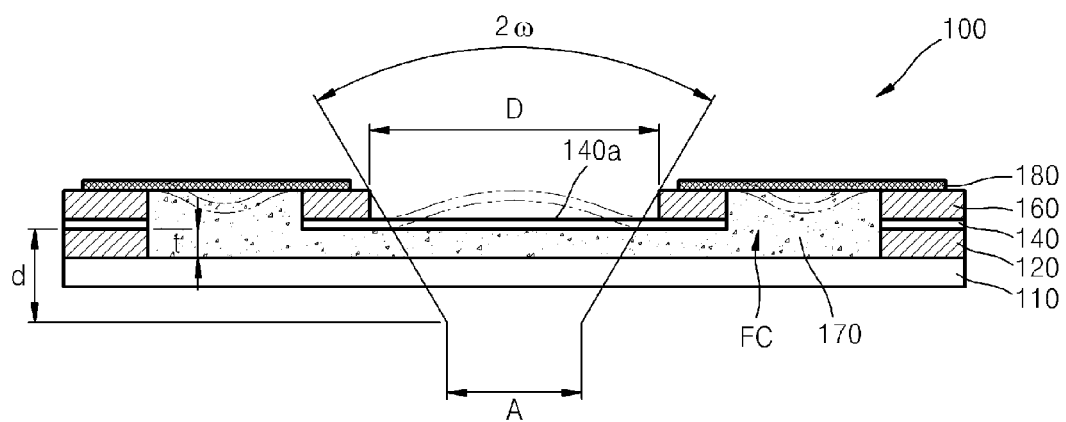
FIG. 3 is a cross-sectional view of the structure of the varifocal lens according to the embodiment of FIGS. 1 and 2.

FIGS. 1, 2 and 3 are respectively an exploded perspective view, a partially cut perspective view and a cross-sectional view of a structure of a varifocal lens 100 according to an exemplary embodiment.

Referring to FIGS. 1, 2 and 3, the varifocal lens 100 includes a transparent substrate 110, a spacer frame 120 arranged to form an inner space on the transparent substrate 110, and a rigid frame 160 having a plurality of holes $H_L$ and $H_T$. The varifocal lens 100 further includes an optical membrane 140 which has a lens surface 140a and is arranged between the rigid frame 160 and the spacer frame 120, an optical fluid 170 filling the inner space, and an actuator 180 applying a pressure to the optical fluid 170 via the plurality of holes $H_L$ and $H_T$ of the rigid frame 160 and thus changing a shape of the lens surface 140a.

The transparent substrate 110 is formed of a transparent material or a translucent material, which transmits a light, and may be formed of a glass substrate.

The spacer frame 120 is formed in such a manner that the inner space may be arranged on the transparent substrate 110, and as illustrated in FIG. 1 outer edges of the transparent substrate 110 and spacer frame 120 may line up with each other. According to such a structure, the inner space is arranged as one space, and thus, when the inner space is filled with an optical fluid and the lens surface 140a is changed due to the pressure by the actuator 180, the optical fluid moves in the same space. That is, a fluid chamber and a lens chamber, which are separately arranged in a conventional structure, are not physically divided according to the present exemplary embodiment. The spacer frame 120 is arranged to set a thickness of the optical fluid 170 to the lens surface 140a, that is, a lens thickness is determined according to a thickness of the spacer frame 120. Thus, the spacer frame 120 does not require an elaborate outer shape and the spacer frame 120 may be formed of various materials, not necessarily silicon, and may have various thicknesses.

The rigid frame 160 is arranged to be fixed to the actuator 180 so as to support the changes in the shape of the actuator 180 and the optical membrane 140. The rigid frame 160 may be formed of a silicon material and may include the plurality of holes $H_L$ and $H_T$. The plurality of holes $H_L$ and $H_T$ include a lens hole $H_L$ and through-holes $H_T$ which are formed around the lens hole $H_L$. The lens hole $H_L$ corresponds to the lens surface 140a of the optical membrane 140, and provides a space in which the shape of the lens surface 140a may be changed when the actuator 180 applies pressure to the optical fluid 170. The through-holes $H_T$ are arranged in such a manner that the actuator 180 applies pressure to the optical fluid 170 via the through-holes $H_T$. Referring to FIG. 1, the number of through-holes $H_T$ is 4 but the present exemplary embodiment is not limited thereto.

The optical membrane 140 has the lens surface 140a for sealing the lens hole $H_L$, and is arranged on a surface of the rigid frame 160. The optical membrane 140 may be formed in such a manner that the lens hole $H_L$ of the rigid frame 160 is sealed, and the through-holes $H_T$ of the rigid frame 160 are all open. However, the present exemplary embodiment is not limited thereto and thus, the optical membrane 140 may be formed in such a manner that only some of the through-holes $H_T$ are open, or the through-holes $H_T$ are sealed. The optical membrane 140 may be formed of a transparent and elastic material such as a silicon elastomer. Also, the optical membrane 140 may be formed of Polydimethylsiloxane (PDMS) having excellent performance in terms of durability and flexibility. A functional coating layer or a protective layer such as an anti-reflective layer and an infrared blocking coat layer may be further formed on the lens surface 140a of the optical membrane 140.

The actuator 180 is arranged to apply the pressure to the optical fluid 170 via the through-holes $H_T$, and may be formed as one of general actuators operating according to various methods. In the exemplary embodiment of FIGS. 1 through 3, the actuator 180 may be formed as a polymer actuator that is formed of electro active polymer (EAP) the thickness of which is very small and power consumption is low. Also, the actuator 180 may be formed as a relaxor ferroelectric polymer actuator that has a polymer composition such as P(VDF-TrFE_CFE) or P(VDF-TrFE-CTFE). Although not specifically illustrated in the drawings with respect to a structure of the actuator 180, the actuator 180 is driven to cause an electrostrictive strain according to an applied voltage, thereby applying the pressure to the optical fluid 170. The actuator 180 may have a structure with a plurality of divided parts which can individually adjust the applied pressure via the plurality of through-holes $H_T$.

In the exemplary embodiment of FIGS. 1 through 3, the actuator 180 corresponds to a polymer actuator 180 arranged to seal the through-holes $H_T$, and is formed on a surface of the rigid frame 160, which is opposite a surface on which the optical membrane 140 is formed. Thus, a space, which is formed by the transparent substrate 110, the spacer frame 120, the rigid frame 160, the optical membrane 140 and the polymer actuator 180, becomes a fluid chamber 172 that is to be filled with the optical fluid 170. A silicon oil may be used as the optical fluid 170.

In FIGS. 1 through 3, the polymer actuator 180 is arranged to seal the through-holes $H_T$ but the present exemplary embodiment is not limited thereto, and thus, a common elastic film may be used to seal the through-holes $H_T$, and the polymer actuator 180 may be formed on the elastic film.

Functions of the varifocal lens 100 according to the present exemplary embodiment will be described in detail with reference to the cross-sectional view of FIG. 3.

A variation of a focal distance of the varifocal lens 100 is achieved by driving the polymer actuator 180. As denoted using a dotted line in FIG. 3, when the polymer actuator 180 changes in shape to be curved in a downward direction according to an applied voltage, a flow is formed in the optical fluid 170 so that a shape of the fluid chamber 172 changes and the lens surface 140a of the optical membrane 140 is made to bulge. When this shape change occurs, the varifocal lens 100 according to the present exemplary embodiment has a structure in which the rigid frame 160 externally supports the optical membrane 140 so that reliability of adhesion part between the optical membrane 140 and the rigid frame 160 increases.

The change in shape of the lens surface 140a is determined according to the change in shape of the polymer actuator 180, and a property of the optical membrane 140, e.g., Young's modulus (E) and Poisson's ratio (v). As well as a refractive index of the optical fluid 170, a curvature of the lens surface 140a is a factor that causes the variation in the focal distance, and thus, the polymer actuator 180 is driven to allow the focal distance to be adjusted within an appropriate range.

The varifocal lens 100 may be used by itself. However, the varifocal lens 100 may be added to an optical imaging system (not shown) having a predetermined focal distance, thereby adjusting a total focal distance. In this regard, when an aperture, via which light from the optical imaging system reaches the varifocal lens 100 is referred to as A, an angle of view is 2ω, and a distance between the optical imaging system and the lens surface 140a is d, a length D, which corresponds to a lens diameter of the varifocal lens 100, has to satisfy Equation 1 below.

$$D \geq A + 2d \cdot \tan \omega \qquad (1)$$

where, the distance d corresponds to a distance between the lens surface 140a and a first optical component of the optical imaging system to the varifocal lens 100, and grows greater as a thickness t of the varifocal lens 100 increases. The thickness t of the varifocal lens 100 corresponds to a thickness of the optical fluid 170 and the lens surface 140a. The thickness t is determined according to a thickness of the spacer frame 120, that is, the smaller the thickness of the spacer frame 120 is, the smaller the lens diameter D is.

Figure 4:
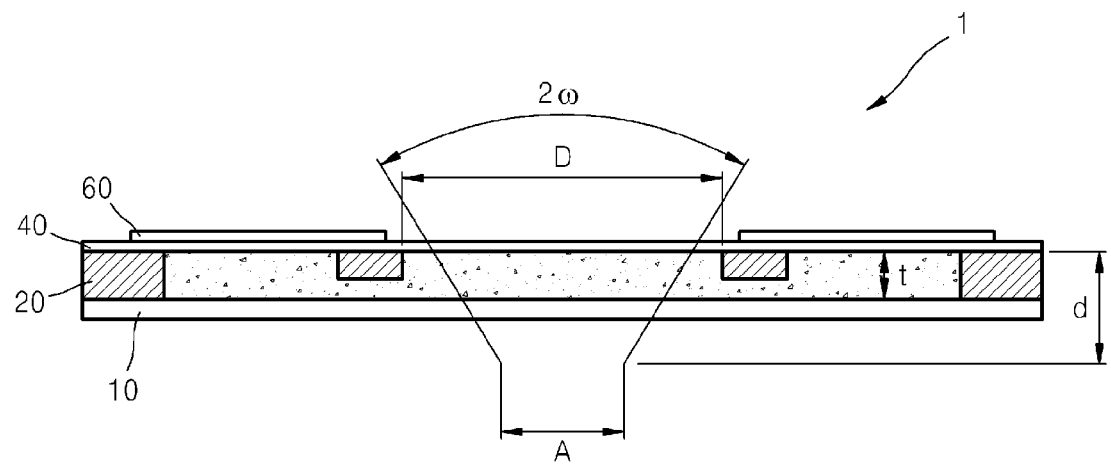
FIG. 4 is a cross-sectional view of a varifocal lens as an example compared to the embodiment of FIGS. 1, 2 and 3.

Referring to FIG. 4, which shows a varifocal lens 1 illustrated as a comparison example to be compared with the varifocal lens 100 according to the present exemplary embodiment, the varifocal lens 1 includes a substrate 10, a rigid frame 20 formed on the substrate 10, a membrane 40 for covering the front of the rigid frame 20, and an actuator 60 arranged on a top surface of the membrane 40. In this structure, a thickness of an optical fluid for forming a thickness of the varifocal lens 1 is determined according to a thickness of the rigid frame 20. In this regard, the rigid frame 20 is commonly formed as a silicon substrate, the thickness of which exceeds 300 µm. Thus, when the varifocal lens 1 having this structure is added to an optical imaging system having a predetermined focal distance so as to adjust a total focal distance, there is a limit to how much the distance d of Equation 1 can be reduced, and thus there is a limit to how much the lens diameter D can be reduced.

As described above, reduction of a lens thickness may reduce the lens diameter D satisfying a condition of Equation 1. In addition, in view of an optical function, when the lens thickness is small, a same optical function may be realized via a smaller lens diameter, which is clearly illustrated in FIG. 5.

Figure 5:
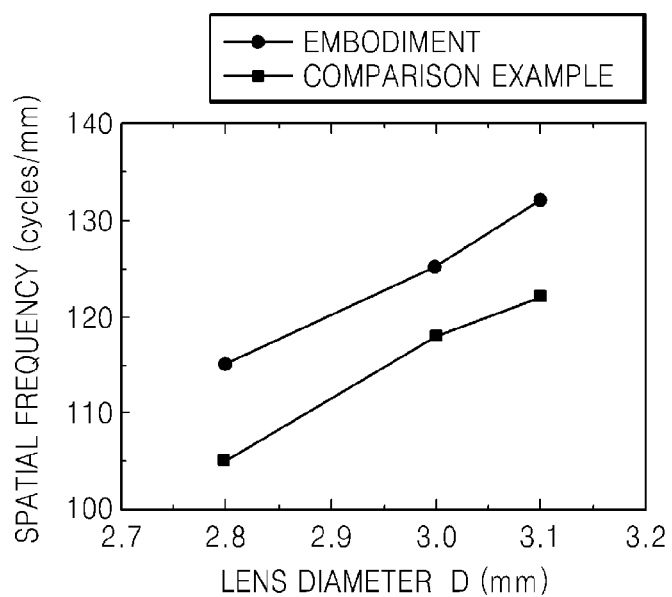
FIG. 5 is a graph of a relationship between a lens diameter and a spatial frequency with respect to the varifocal lens according to the comparison example and the varifocal lens according to the embodiment.

FIG. 5 is a graph of a relationship between a lens diameter and a spatial frequency with respect to the varifocal lens 1 according to the comparison example and the varifocal lens 100 according to the exemplary embodiment. In this regard, a lens thickness of the comparison example is 300 µm, and a lens thickness of the present exemplary embodiment is 150 µm. The graph shows the spatial frequency where a modulation transfer function (MTF) reaches 30% with respect to a 0.7 field. Referring to the graph, it is possible to see that the spatial frequency in the present exemplary embodiment is higher than that in the comparison example. In the present exemplary embodiment, the lens thickness is small and thus, a same spatial frequency may be realized via a smaller lens diameter, compared to the comparison example.

Figure 6:
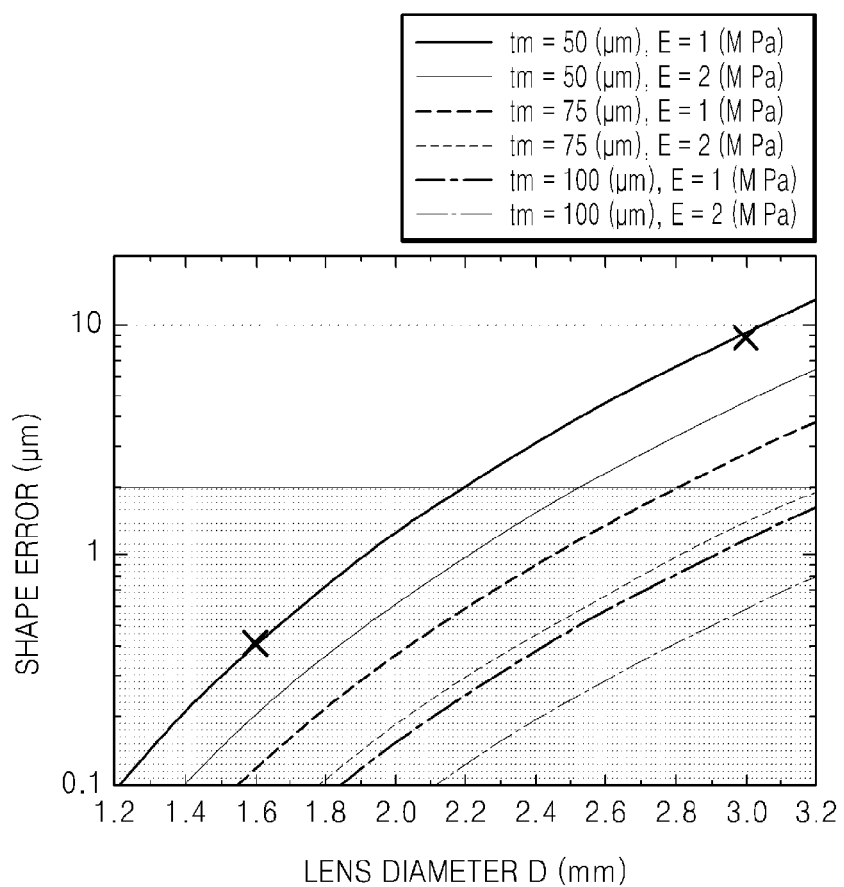
FIG. 6 is a graph of a shape error according to a lens diameter, with respect to several compositions of thickness and Young's modulus of an optical membrane.

The reduction in the lens diameter may result in a reduction in the size of an entire device, and also, may reduce a shape error due to gravity. FIG. 6 is a graph of a shape error according to a lens diameter, with respect to several compositions of a thickness tm of the optical membrane 140 forming the lens surface 140a and Young's modulus (E). In general, when the varifocal lens 100 is used, a side part in the cross-sectional view of FIG. 3, that is, a left side or a right side corresponds to the direction of gravity. In this case, a flow of the optical fluid 170 due to gravity causes deformation of a shape of the lens surface 140a. Such a shape error $e_{shape}$ is a maximum sag characteristic of the optical membrane 140, and is defined in Equation 2.

$$e_{shape} = F\frac{\rho D^5}{Et^3} \quad (2)$$

where, ρ indicates the density of the optical fluid 170, t indicates a thickness of the optical membrane 140, E indicates Young's modulus of the optical membrane 140, D indicates a lens diameter and F indicates a load distribution factor.

Equation 2 is an approximate equation in which surface tension or a pretension effect was not considered. In order to calculate the load distribution factor F exhibited in the graph of FIG. 6, a simulator using Finite Element Analysis (FEA) method was used.

The shape error is dependent on the density ρ of the optical fluid 170, the thickness t of the optical membrane 140, and a physical property of the optical membrane 140, and also, is highly dependent on the lens diameter. Referring to the graph of FIG. 6, for example, in the case where the shape error is to be maintained under 2 μm, this condition may be satisfied in various cases as the lens diameter grows smaller. In the case where the lens diameter is 3.0 mm, the shape error is maintained under 2 μm in only three cases including two cases where a membrane thickness is 100 μm and one case where a membrane thickness is 75 μm and Young's modulus is 2 Mpa. However, in the case where the lens diameter is 1.6 mm, the shape error is maintained under 2 μm in all the cases shown in FIG. 6.

Figure 7:
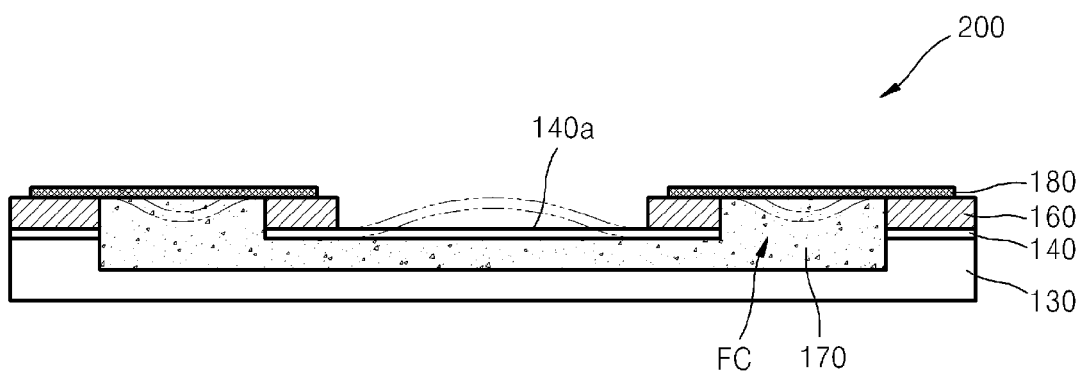
FIG. 7 is a cross-sectional view of a structure of a varifocal lens according to another embodiment.

FIG. 7 is a cross-sectional view of a structure of a varifocal lens 200 according to another exemplary embodiment. The varifocal lens 200 includes a transparent substrate 130 of which a side frame is formed as one body, an optical membrane 140 having a lens surface 140a, a rigid frame 160, and a polymer actuator 180. Compared to the exemplary embodiment of FIGS. 1 through 3, the current exemplary embodiment of FIG. 7 is different in that a spacer frame (120 of FIG. 3) and a transparent substrate (110 of FIG. 3) form the transparent substrate 130 as one body. Other functions are the same, that is, a space, which is formed by the transparent substrate 130, the optical membrane 140 and the polymer actuator 180, becomes a fluid chamber FC to be filled with an optical fluid 170, a lens thickness is determined according to a thickness of the side frame, a lens diameter is appropriately determined according to the thickness of the side frame, and when the polymer actuator 180 is driven, the shape of the lens surface 140a changes so that a focal distance varies.

Figure 8:
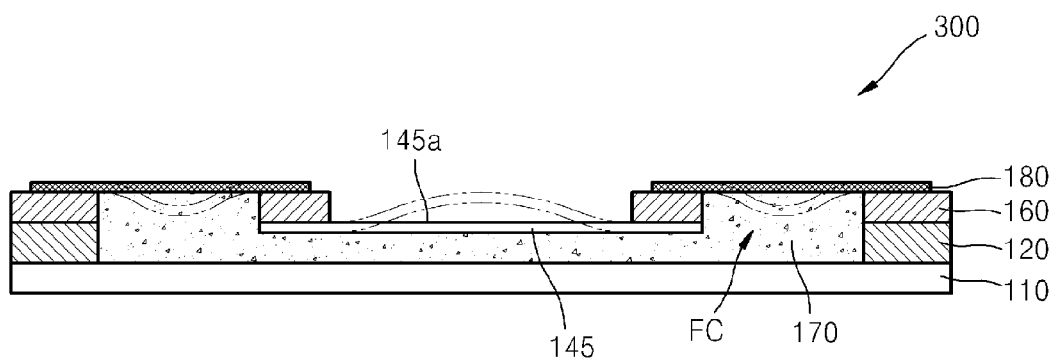
FIG. 8 is a cross-sectional view of a structure of a varifocal lens according to another embodiment.

FIG. 8 is a cross-sectional view of a structure of a varifocal lens 300 according to another exemplary embodiment. Compared to the exemplary embodiment of FIGS. 1 through 3, the current exemplary embodiment of FIG. 8 is different in that an optical membrane 145 having a lens surface 145a is formed to cover only a lens hole of a rigid frame 160, and is not extended toward an adhesive portion between a spacer frame 120 and the rigid frame 160 as is the case in the exemplary embodiment of FIGS. 1 through 3. In the case of the current exemplary embodiment of FIG. 8, the thickness of the optical fluid 170 corresponding to a lens thickness, is smaller than a thickness of the spacer frame 120. Other functions are the same as the exemplary embodiment of FIGS. 1 through 3, that is, an appropriate lens diameter is determined according to the lens thickness determined to satisfy the aforementioned conditions, and a focal distance varies when the shape of the lens surface 145a changes since a polymer actuator 180 is driven.

Figure 9:
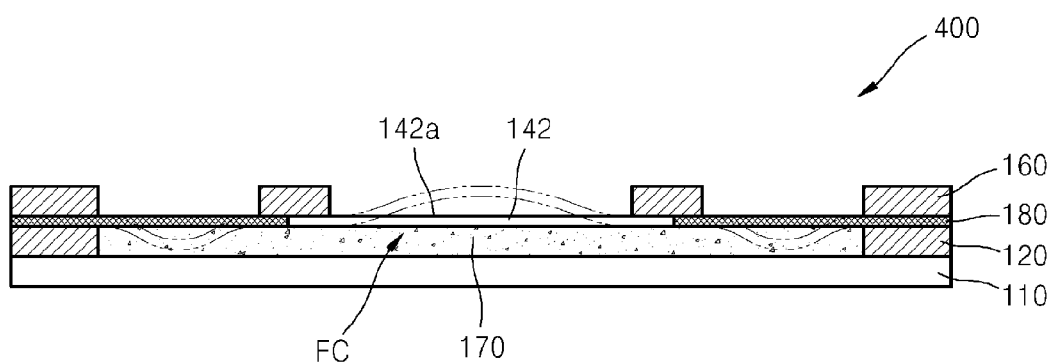
FIG. 9 is a cross-sectional view of a structure of a varifocal lens according to another embodiment.

FIG. 9 is a cross-sectional view of a structure of a varifocal lens 400 according to another exemplary embodiment. Compared to the exemplary embodiment of FIGS. 1 through 3, the current exemplary embodiment of FIG. 9 is different in that a polymer actuator 180 is formed on a surface of a rigid frame 160, wherein an optical membrane 142 is formed on the surface of the rigid frame 160. In the case of the current exemplary embodiment of FIG. 9, functions are the same as the exemplary embodiment of FIGS. 1 through 3, that is, a space, which is formed by a transparent substrate 110, a spacer frame 120, the optical membrane 142 and the polymer actuator 180, becomes a fluid chamber FC to be filled with an optical fluid 170, a lens thickness is determined according to a thickness of the spacer frame 120, a lens diameter is appropriately determined according to the lens thickness, and when the polymer actuator 180 is driven, a shape of a lens surface 142a changes so that a focal distance varies. In FIG. 9, an optical membrane 140 is formed only on the surface of the rigid frame 160, where the polymer actuator 180 is not formed, however, the optical membrane 140 may be formed to cover all or a portion of the polymer actuator 180.

Figure 10:
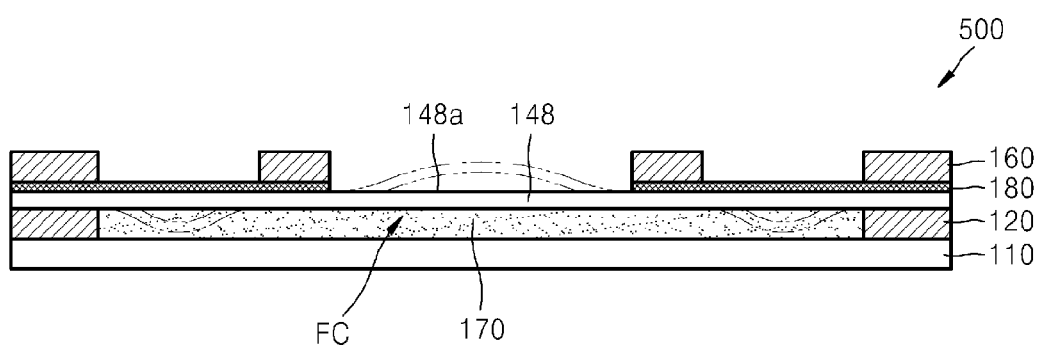
FIG. 10 is a cross-sectional view of a structure of a varifocal lens according to another embodiment.

FIG. 10 is a cross-sectional view of a structure of a varifocal lens 500 according to another exemplary embodiment. Compared to the exemplary embodiment of FIG. 9, the current exemplary embodiment of FIG. 10 is different in that an optical membrane 148 is formed on a spacer frame 120 in such a manner that the optical membrane 148 seals an inner space filled with an optical fluid 170. In the case of the current exemplary embodiment of FIG. 10, functions are the same as the exemplary embodiment of FIG. 9, that is, a space, which is formed by a transparent substrate 110, a spacer frame 120, and the optical membrane 148, becomes a fluid chamber FC to be filled with the optical fluid 170, a lens thickness is determined according to a thickness of the spacer frame 120, a lens diameter is appropriately determined according to the lens thickness, and when the polymer actuator 180 is driven, a shape of a lens surface 142a changes so that a focal distance varies.

FIGS. 11A through 11E are diagrams for describing operations of a method of manufacturing a varifocal lens, according to an exemplary embodiment.

Figure 11A:
FIGS. 11A through 11E are diagrams for describing operations of a method of manufacturing a varifocal lens, according to an embodiment.

First, as illustrated in FIG. 11A, a rigid frame 160 is arranged and then a polymer actuator 180 is bonded to a surface of the rigid frame 160. The rigid frame 160 has a plurality of through-holes. The rigid frame 160 may have a shape as illustrated in FIG. 1, and may be formed as a silicon substrate by performing a general etching process or a machining process. The polymer actuator 180 may be formed as a relaxor ferroelectric polymer actuator that is formed of a polymer composition such as P(VDF-TrFE_CFE) or P(VDF-TrFE-CTFE).

Figure 11B:
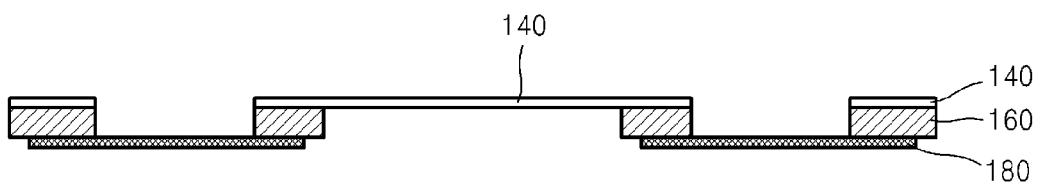

Next, referring to FIG. 11B, an optical membrane 140 is formed on the other surface of the surface of the rigid frame 160. The optical membrane 140 may be formed of a transparent and elastic material such as a silicon elastomer. Also, the optical membrane 140 may be formed of Polydimethylsiloxane (PDMS) having excellent performance in terms of durability and flexibility. The optical membrane 140 may be directly bonded to the rigid frame 160. In this regard, the optical membrane 140 may be formed on an entire surface of the rigid frame 160, and then a portion of the optical membrane 140 facing the polymer actuator 180 may be removed.

Figure 11C:
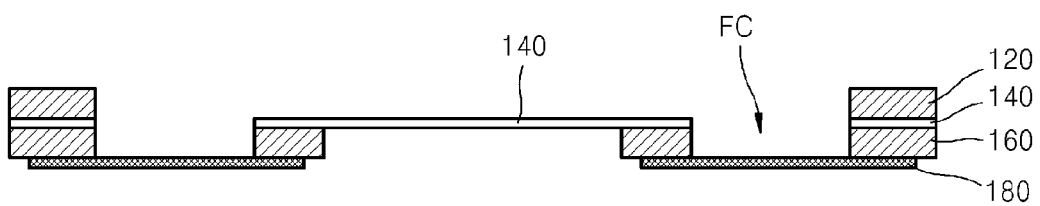

As illustrated in FIG. 11C, a spacer frame 120 is arranged to form a fluid chamber FC. Referring to FIG. 11C, a portion of the optical membrane 140 is interposed between the rigid frame 160 and the spacer frame 120. However, except for a shape of a portion of the optical membrane 140 for forming a lens surface, shapes of other portions of the optical membrane 140 may differ from FIG. 11C, that is, the portion of the optical membrane 140 may not exist in an area where the spacer frame 120 and the rigid frame 160 are bonded to each other. In order to bond the spacer frame 120, a vacuum bonding method or an adhesive may be used. The spacer frame 120 is arranged to form a lens thickness, and thus, the spacer frame 120 does not require an elaborate outer shape. Therefore, the spacer frame 120 may be formed of various materials not necessarily silicon, and may have various thicknesses.

Figure 11D:
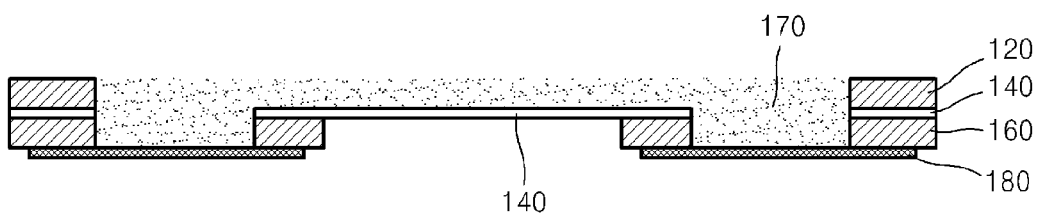

Next, as illustrated in FIG. 11D, the fluid chamber FC is filled with an optical fluid 170. The optical fluid 170 may be a silicon oil.

Figure 11E:
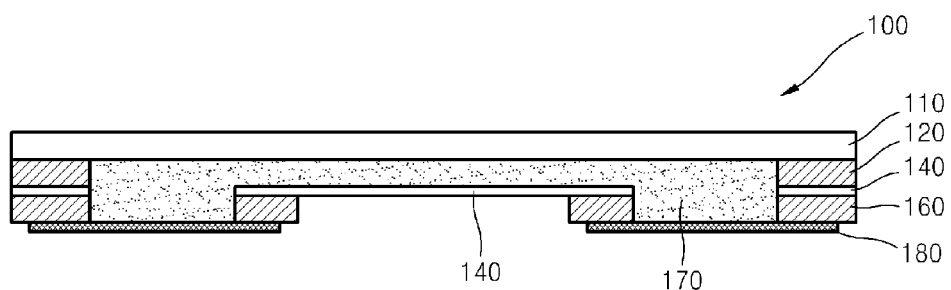

Next, as illustrated in FIG. 11E, the optical fluid 170 is sealed using a transparent substrate 110. The transparent substrate 110 functions to allow light to pass therethrough, and may be formed as a glass substrate.

According to the aforementioned operations, the varifocal lens 100 according to the exemplary embodiment of FIGS. 1 through 3 is manufactured.

FIGS. 12A through 12E are diagrams for describing operations of a method of manufacturing a varifocal lens, according to another exemplary embodiment.

Figure 12A:
FIGS. 12A through 12E are diagrams for describing operations of a method of manufacturing a varifocal lens, according to another embodiment.

First, as illustrated in FIG. 12A, a rigid frame 160 is arranged and then a polymer actuator 180 is bonded to a surface of the rigid frame 160. The rigid frame 160 has a plurality of through-holes. The rigid frame 160 may have a shape as illustrated in FIG. 1, and may be formed as a silicon substrate by performing a general etching process or a machining process. The polymer actuator 180 may be formed as a relaxor ferroelectric polymer actuator that is formed of a polymer composition such as P(VDF-TrFE_CFE) or P(VDF-TrFE-CTFE).

Figure 12B:
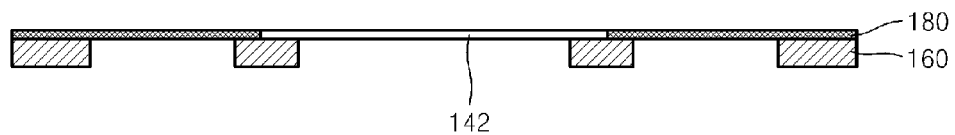

Next, referring to FIG. 12B, an optical membrane 142 is formed on a surface of the rigid frame 160. Here, the optical membrane 142 is formed on the surface on which the polymer actuator 180 is formed. In FIG. 11B, the optical membrane 142 is only formed on an area of the surface of the rigid frame 160, where the polymer actuator 180 is not formed. However, the optical membrane 142 may be formed to partly or entirely cover the polymer actuator 180. The optical membrane 142 may be formed of a transparent and elastic material such as a silicon elastomer or Polydimethylsiloxane (PDMS).

Figure 12C:
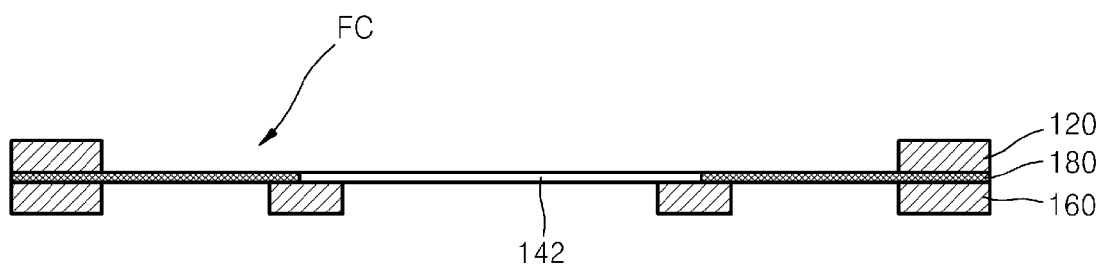

Next, referring to FIG. 12C, a spacer frame 120 is arranged to form a fluid chamber FC. That is, a space, which is formed by the spacer frame 120, the polymer actuator 180 and the optical membrane 142, becomes the fluid chamber FC to be filled with an optical fluid 170. In order to bond the spacer frame 120, a vacuum bonding method or an adhesive may be used.

Figure 12D:
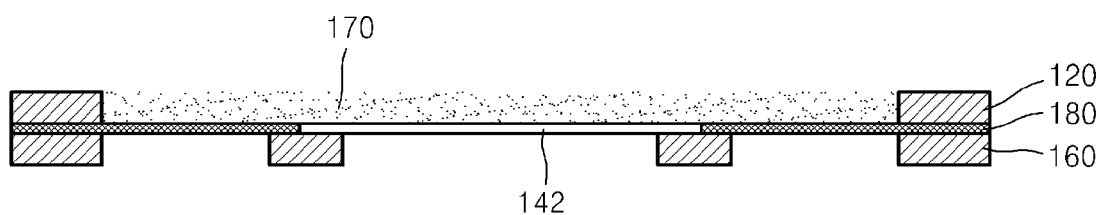
Figure 12E:
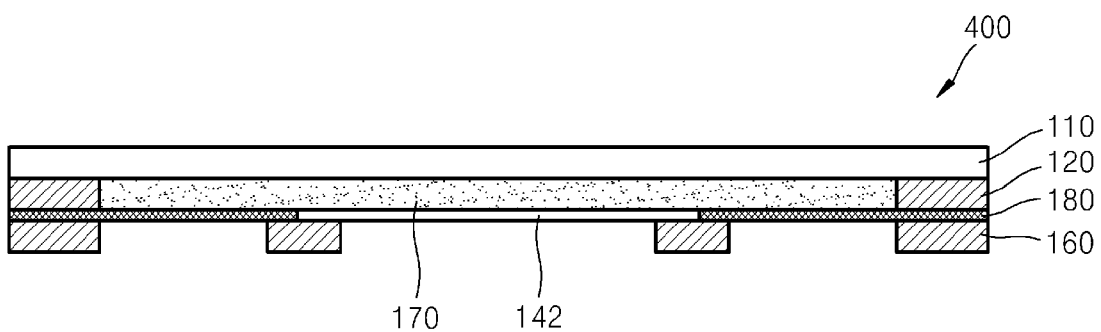

Next, as illustrated in FIG. 12D, the fluid chamber FC is filled with the optical fluid 170, and as illustrated in FIG. 12E, the optical fluid 170 is sealed using a transparent substrate 110.

According to the aforementioned operations, the varifocal lens 400 according to the exemplary embodiment of FIG. 9 is manufactured.

FIGS. 13A through 13D, and FIGS. 14A and 14B are diagrams for describing operations of a method of manufacturing a varifocal lens, according to another exemplary embodiment.

Figure 13A:
FIGS. 13A through 13D, and FIGS. 14A and 14B are diagrams for describing operations of a method of manufacturing a varifocal lens, according to another embodiment.

First, referring to FIG. 13A, a polymer actuator 180 is formed on a rigid frame 160. The rigid frame 160 is arranged to be fixed to the polymer actuator 180 so as to support the change in shape of the polymer actuator 180. The rigid frame 160 has a lens hole and a plurality of through-holes, e.g., may have a shape illustrated in FIG. 1.

Figure 13B:
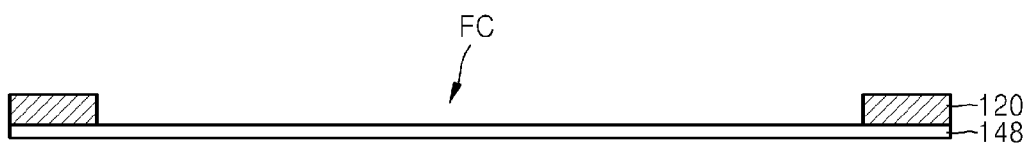

Referring to FIG. 13B, an optical membrane 148 is arranged, and then a spacer frame 120 having a shape to be a sidewall encircling an edge of the optical membrane 148 is bonded to a surface of the optical membrane 148, whereby an inner space to be a fluid chamber FC is formed.

Figure 13C:
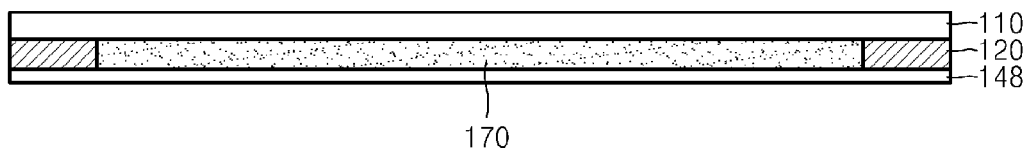

Referring to FIG. 13C, the inner space is filled with an optical fluid 170, and a transparent substrate 110 is bonded to the spacer frame 120, thereby sealing the optical fluid 170.

Figure 13D:
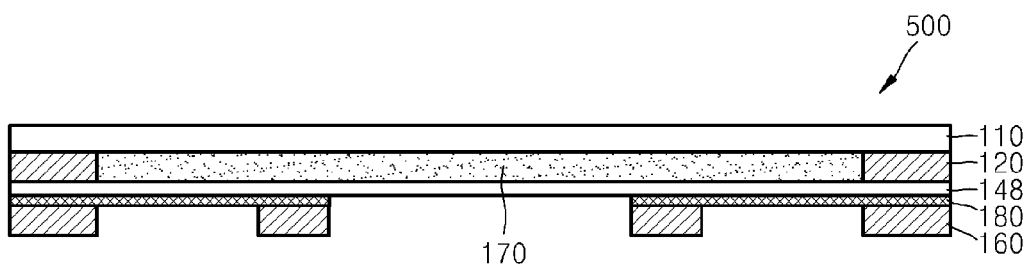

Referring to FIG. 13D, the rigid frame 160 whereon the polymer actuator 180 is formed is bonded to the other surface of the optical membrane 148, in such a manner that the varifocal lens 500 according to the exemplary embodiment of FIG. 10 is manufactured.

Figure 14A:
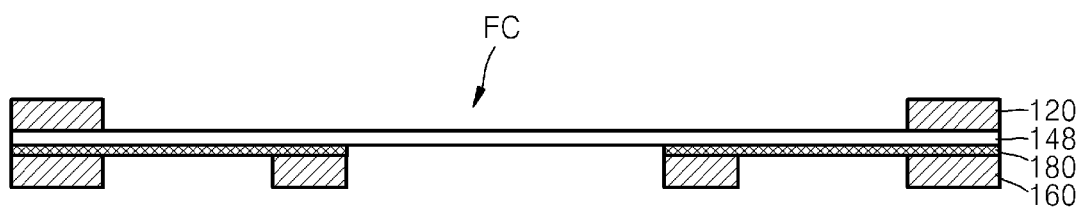
Figure 14B:
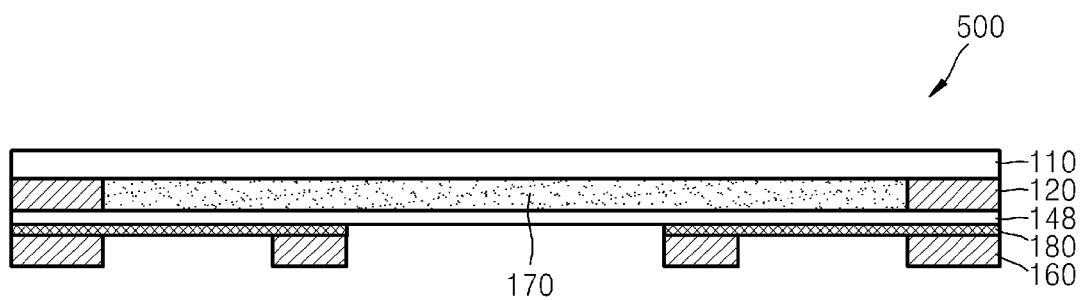

The aforementioned operations described with reference to FIGS. 13A through 13D may be changed when necessary. For example, as illustrated in FIG. 14A, it is also possible to form an inner space to be a fluid chamber FC by bonding the spacer frame 120 to a surface of the optical membrane 148, and to bond the rigid frame 160 whereon the polymer actuator 180 is formed to the other surface of the optical membrane 148. After that, as illustrated in FIG. 14B, it is possible to fill the inner space with the optical fluid 170 and then to form the transparent substrate 110 on the spacer frame 120.

As described above, according to the varifocal lens and the method of manufacturing the same according to one or more of the above exemplary embodiments, the varifocal lens, which has a lens diameter that is easily reduced and which has high reliability, can be provided.

It should be understood that the exemplary embodiments described herein should be considered in a descriptive sense only and not for purposes of limitation. For example, according to the drawings, the polymer actuator 180 is changed in shape to be curved in a downward direction according to the applied voltage and thus, the lens surface (140a, 142a, 145a and 148a) is made convex. However, the polymer actuator 180 may change in shape to be curved in an upward direction and thus, the lens surfaces 140a, 142a, 145a and 148a may be made concave. Also, according to the drawings, a portion of the transparent substrate 110 is flat, wherein the portion corresponds to the lens surface (140a, 142a, 145a and 148a). However, if required, the portion may be made concave or convex.

The varifocal lens according to the one or more of the above exemplary embodiments has a structure in which the optical fluid forming the lens thickness may be reduced. Therefore, the lens diameter may be formed to be smaller, while maintaining an excellent optical function. By doing so, the overall size of a device is reduced so as to be advantageous for mass manufacturing. Also, according to the structure, the rigid frame externally supports the optical membrane so that reliability of adhesion part increases.

The method according to one or more of the above exemplary embodiments provides the varifocal lens, and provides a relatively easy manufacturing process since the method forms the polymer actuator directly on the rigid frame.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:
1. A varifocal lens comprising:
a transparent substrate;
a spacer frame arranged to form an inner space above the transparent substrate;
a rigid frame comprising a lens hole and one or more through-holes, and a first surface and a second surface facing away from each other;

an optical membrane comprising a lens surface corresponding to the lens hole of the rigid frame, the optical membrane being disposed to face the first surface;
an optical fluid disposed in the inner space; and
an actuator which is arranged to be fixed to the rigid frame and applies a pressure to the optical fluid so as to change a shape of the lens surface.

2. The varifocal lens of claim 1, wherein the spacer frame has a shape to be a sidewall encircling an edge of the transparent substrate, and thus forms an inner space.

3. The varifocal lens of claim 1, wherein the one or more through-holes comprise a plurality of through-holes, and the plurality of through-holes are formed around the lens hole.

4. The varifocal lens of claim 3, wherein the actuator comprises a polymer actuator arranged to seal the one or more through-holes.

5. The varifocal lens of claim 4, wherein the polymer actuator is formed on the second surface, and the optical fluid fills a space formed by the transparent substrate, the spacer frame, the rigid frame, the optical membrane and the polymer actuator.

6. The varifocal lens of claim 4, wherein the polymer actuator is formed on the first surface, and the optical fluid fills a space formed by the transparent substrate, the spacer frame, the optical membrane and the polymer actuator.

7. The varifocal lens of claim 4, wherein the polymer actuator is formed on the first surface, and the optical membrane is formed on the spacer frame so as to seal the inner space filled with the optical fluid.

8. The varifocal lens of claim 4, wherein the polymer actuator is formed of a P(VDF-TrFE_CFE) material or a P(VDF-TrFE-CTFE) material.

9. The varifocal lens of claim 1, wherein the optical membrane comprises is formed of silicon elastomer.

10. The varifocal lens of claim 1, wherein the transparent substrate and the spacer frame are formed as one body.

11. The varifocal lens of claim 1, wherein the rigid frame is formed of silicon.

12. The varifocal lens of claim 1, wherein the optical fluid comprises silicon oil.

13. A varifocal lens added to an optical imaging system having a predetermined focal distance, thereby adjusting a total focal distance, the varifocal lens comprising:
a transparent substrate;
a spacer frame arranged to form an inner space above the transparent substrate;
a rigid frame comprising a lens hole and one or more through-holes, and a first surface and a second surface facing away from each other;
an optical membrane comprising a lens surface corresponding to the lens hole of the rigid frame, the optical membrane being disposed to face the first surface;
an optical fluid to fill the inner space; and
an actuator which is arranged to be fixed to the rigid frame and applies a pressure to the optical fluid so as to change a shape of the lens surface;
wherein, when an aperture, through which a light from the optical imaging system reaches the varifocal lens, is referred to as A, an angle of view is 2ω, and a distance between the optical imaging system and the lens surface is d, a diameter D of the lens hole satisfies:

$$D \geq A + 2d \cdot \tan \omega.$$

14. The varifocal lens of claim 13, wherein the spacer frame has a shape to be a sidewall encircling an edge of the transparent substrate, and thus forms an inner space.

15. The varifocal lens of claim 13, wherein the one or more through-holes comprise a plurality of through-holes, and the plurality of through-holes are formed around the lens hole.

16. The varifocal lens of claim 15, wherein the actuator comprises a polymer actuator arranged to seal the one or more through-holes.

17. The varifocal lens of claim 16, wherein the polymer actuator is formed on the second surface, and the optical fluid fills a space formed by the transparent substrate, the spacer frame, the rigid frame, the optical membrane and the polymer actuator.

18. The varifocal lens of claim 16, wherein the polymer actuator is formed on the first surface, and the optical fluid fills a space formed by the transparent substrate, the spacer frame, the optical membrane and the polymer actuator.

19. The varifocal lens of claim 16, wherein the polymer actuator is formed on the first surface, and the optical membrane is formed on the spacer frame so as to seal the inner space filled with the optical fluid.

20. A method of manufacturing a varifocal lens, the method comprising:
forming a rigid frame comprising a lens hole and one or more through-holes, and having a first surface and a second surface facing away from each other;
forming a polymer actuator on the first surface so as to be fixed to the rigid frame;
forming an optical membrane on the second surface, wherein the optical membrane comprises a lens surface corresponding to the lens hole;
forming a spacer frame to form a predetermined inner space with the polymer actuator, the rigid frame, and the optical membrane;
filling the predetermined inner space with an optical fluid; and
forming a transparent substrate on the spacer frame to seal the optical fluid.

21. A method of manufacturing a varifocal lens, the method comprising:
forming a rigid frame comprising a lens hole and one or more through-holes, and having a first surface and a second surface facing away from each other;
forming a polymer actuator on the first surface so as to be fixed to the rigid frame;
forming an optical membrane on the first surface, wherein the optical membrane comprises a lens surface corresponding to the lens hole;
forming a spacer frame to form a predetermined inner space with the polymer actuator and the optical membrane;
filling the predetermined inner space with an optical fluid; and
forming a transparent substrate on the spacer frame to seal the optical fluid.

22. A method of manufacturing a varifocal lens, the method comprising:
forming a rigid frame comprising a lens hole and one or more through-holes, and forming a polymer actuator on the rigid frame so as to be fixed to the rigid frame;
arranging an optical membrane comprising a first surface and a second surface facing each other, and forming an inner space by forming a spacer frame on the first surface, wherein the spacer frame has a shape to be a sidewall encircling an edge of the optical membrane;
filling the inner space with an optical fluid;
forming a transparent substrate on the spacer frame so as to seal the optical fluid; and bonding the rigid frame whereon the polymer actuator is formed to the second surface of the optical membrane.

23. The method of claim 22, wherein the optical membrane is formed of silicon elastomer.

24. The method of claim 22, wherein the rigid frame is formed of silicon.

25. The method of claim 22, wherein the polymer actuator is formed of a P(VDF-TrFE_CFE) material or a P(VDF-TrFE-CTFE) material.

26. The method of claim 22, wherein the optical fluid comprises silicon oil.

* * * * *